United States Patent Office 3,567,468
Patented Mar. 2, 1971

3,567,468
FROZEN FOODS
Donald Kiteley Tressler, 74 N. Compo Road,
Westport, Conn. 06880
No Drawing. Filed Dec. 27, 1966, Ser. No. 604,571
Int. Cl. A23b 7/04
U.S. Cl. 99—193      10 Claims

ABSTRACT OF THE DISCLOSURE

This invention relates to a boil-in-the-bag frozen food package and the method of producing same comprising a sealed heat-resistant container and within said container a frozen comestible and a dry sauce mix, said sauce mix being present in an amount sufficient to use in its constitution to a liquid sauce, the liquid resulting from heating the container in preparation of the contents for consumption.

---

This invention relates to packaged frozen comestibles and in particular to the preparation of packaged frozen vegetables which are heated for consumption while still in the package, i.e., "boil-in-the-bag" products.

During the steps of cleaning, washing, blanching, cooling, freezing, thawing and/or cooking, most vegetables lose much of their characteristic fresh flavor. Because of this they require the addition of condiments and also flavor improvers, such as monosodium glutamate, in order to make them sufficiently palatable to the consumer. It has been attempted to compensate for this flavor loss by cooking the vegetables in a sauce prior to freezing and then placing the cooked mass in a sealed heat resistant container or by including a liquid sauce with the vegetable to be frozen. When the vegetable is prepared for consumption, the container with the frozen vegetable and sauce is placed in boiling water for a period of time sufficient to heat the product to the proper temperature for serving. This is, of course, the conventional boil-in-the-bag type product.

Such techniques are, however, not entirely suitable since vegetables exude liquid when heated for use diluting the sauce and further the sauce itself tends to separate on this reheating. Equally importantly, the sauces now used must contain special starches such as the waxy maize starches so that they will not curdle upon freezing.

It has now been found that boil-in-the-bag frozen comestibles can be prepared which retain their flavor constituents without either heating the comestible in the cream sauce prior to freezing or adding a fluid and without diluting the sauce or requiring special starches resistant to curdling upon freezing.

Briefly stated, the present invention comprises a boil-in-the-bag frozen food package comprising a sealed heat-resistant container and within said container a frozen comestible and a dry sauce mix, said mix being present in an amount sufficient to use in its reconstitution to a liquid sauce, the liquid resulting from heating the container in preparation of the contents for consumption. The invention also comprises the method of making such products.

While the invention has applicability to all food products which suffer moisture and flavor loss in being treated for freezing and in subsequent thawing, it is particularly applicable to vegetables and will be discussed in connection therewith. With vegetables it is especially useful for those which lose excessive amounts of moisture during blanching and freezing and subsequent thawing with a consequent loss in flavor constituents and a development of off-flavors. Examples of such vegetables are mushrooms, spinach, Swiss chard, summer squash, kale, and mixtures thereof. The invention is, of course, equally useful for other vegetables such as cauliflower, cabbage, peas, corn, okra, lima beans, and mixtures thereof which also suffer from flavor loss.

The container may be made of any of the conventional materials, such as plastics, which are used now to prepare the boil-in-the-bag type products. These are heat-resistant materials which can be boiled in water without disintegration or permitting water vapor to pass therethrough. Examples are polyethylene, polyvinylidene chloride, aluminum foil laminated to plastic sheeting, and the like known materials.

As to the dry sauce mix, it is preferable that the starch used be one that goes into solution at temperatures of about 170° to about 180° F. A starch or flour can be used which does not dissolve until the temperature reaches 212° F., but, if such is used, the bag or pouch must be kept in the boiling water bath until all of its contents reach this temperature. Samples of such starches are the pregelatinized starches, modified starches, and the partially solubilized starches. Presently prepared sauces which are pre-cooked before being frozen with the vegetables must contain special waxy maize starches which will not curdle on freezing. These are not required for the instant invention.

As herein used, the term "sauce" is meant to include any sauce or gravy customarily used in preparing creams, sauces, gravies and the like for vegetables and other food products. In addition to the starch, other usual components of sauces are used, such as monosodium glutamate; various flavoring agents such as pepper, salt, onion powder; nonfat dry milk solids; and cream materials, such as dry synthetic cream powders, if one is to make a cream sauce.

In the manufacture of the products of the instant invention the vegetables are given the usual prefreezing treatment and then frozen as quickly as possible. The desired method is individual quick freezing of the vegetable in a spray of liquid nitrogen, or by mixture with crushed Dry Ice, or in a blast of very cold air. The desired quantity of frozen vegetables is placed in the boil-in-the-bag container; then a measured quantity of the dry sauce mix is added to the bag. There is no heating of the vegetable and the sauce together until just prior to consumption. The container is then evacuated and heat-sealed.

When the item is to be used by the consumer the container with the contents is merely placed in boiling water and kept there until the product has reached the serving temperature, e.g., about 180° F. The container is removed from the boiling water, opened, and the contents emptied into a serving dish. The amount of dry sauce mix added is calculated so as to use the liquid that customarily exudes from the product during this heating to become constituted as the sauce. This amount of sauce mix to be used is readily calculated for each specific comestible to be packaged by making pilot runs to determine the average moisture lost per given unit of comestible. Once this is noted for each specific comestible the amount of sauce mix to be added, and in some cases frozen source of liquid as noted below, is determine dependent upon how much available moisture there is to constitute the dry mix as a liquid sauce to the thickness of sauce desired.

Thus, the product and the sauce which are intermingled and heated together for the first time just prior to consumption retain all the flavoring characteristics of the product without diluting the sauce and avoiding the bland taste usually associated with frozen vegetables.

In a modification of the instant invention, to improve the flavor of vegetables that are cooked before being placed in the boil-in-the-bag container (such as peas, cauliflower, lima beans) a frozen source of liquid, such as powdered ice, milk, cream, broth or the like, is added to the container to provide part of the liquid needed to rehydrate the sauce mix. Even cooked vegetables exude moisture when reheated for serving and thereby lose flavoring components. A source of liquid can also be utilized when packaging the uncooked vegetables if it is desired to have a thinner sauce.

The invention will be further described in connection with the following examples which are for purposes of illustration only.

EXAMPLE 1

Freshly harvested mushrooms were processed for freezing by first removing the base of the stems, washing with mushrooms, and then slicing them into pieces approximately three-eighths inch thick. The slices were then steam-blanched for thirty seconds, drained, and frozen rapidly by mixing them with powdered Dry Ice. The slices were removed from the Dry Ice and units of 130 grams each placed in heat-resistant transparent polyethylene bags.

To each bag was added 15 grams of a dry cream sauce mix of the following composition:

|  | Parts by weight |
|---|---|
| Col-flo[1] starch | 32.1 |
| Clearjel[1] starch | 9.1 |
| Cremora[2] | 37.0 |
| Non-fat dry milk solids | 9.1 |
| Monosodium glutamate | 2.7 |
| Mertast (an inosinate) | 0.1 |
| Onion powder | 1.6 |
| Salt | 8.0 |
| White pepper | 0.3 |
|  | 100.0 |

[1] Partially hydrolyzed corn starches.
[2] An imitator dry cream.

The bags were then heat sealed after the air was evacuated. The product was prepared for eating by placing the sealed bag in boiling water for ten minutes after which the bag was opened and the contents emptied.

EXAMPLE 2

100 parts by weight of frozen okra cut in one-half inch slices were placed in a heat-resistant polyethylene bag. To the bag was also added 16 parts by weight of a dry sauce mix consisting of 3 parts by weight of dry tomato powder to one part by weight of the dry cream mix of Example 1, 90 parts by weight of crushed ice, 20 parts by weight of frozen chopped green peppers, and 2 parts by weight of granulated sugar. A vacuum was drawn, the bag heat-sealed and the package kept under frozen storage.

The product was prepared for consumption by placing the sealed bag in boiling water for 10 minutes (at which time the product had a temperature of about 180° F.) and then opening the bag and emptying the product into a serving dish.

EXAMPLE 3

Two dry cream sauce mixes, A and B, below were prepared and used to prepare a variety of boil-in-the-bag products as set forth in Example 4.

|  | Sauce A | Sauce B |
|---|---|---|
| Cremora | 50.55 | 47.9 |
| Polar Gel 1[1] | 30.6 | 17.0 |
| Clearjel[1] | 7.5 | 17.1 |
| Non-fat dry milk solids | 7.5 | 7.5 |
| Monosodium glumate | 2.2 | 2.2 |
| Mertast | 0.08 | 0.08 |
| Onion power | 1.3 | 1.3 |
| Salt |  | 6.7 |
| White pepper | 0.27 | 0.22 |
| Total parts by weight | 100.00 | 100.00 |

[1] Both partially hydrolized corn starches.

EXAMPLE 4

A creamed mushroom product was prepared by first preparing and freezing mushrooms as set forth in Example 1. Also frozen green peppers were prepared cutting them into 1″ by ¼″ pieces, blanching them in boiling water and then freezing. Lastly, frozen pimiento was prepared by cutting canned pimiento into ¼″ by ¼″ pieces and freezing. The above were placed into a heat resistant polyethylene bag along with the other components noted below in the listed proportions so that each bag contained:

|  | Grams |
|---|---|
| Frozen mushroom slices | 130.0 |
| Green peppers | 8.0 |
| Pimiento | 6.0 |
| Marjoram | 0.01 |
| Onion flakes | 1.0 |
| Salt | .14 |
| Powdered ice | 45.0 |
| Sauce B of Example 3 | 18.0 |

The air was evacuated from the bags and the bags sealed and kept frozen until use. The product was prepared for consumption by placing it into a pot of boiling water. When the water returned to boil, the bag and contents were boiled for 13 minutes, and the bag then opened and the contents served.

EXAMPLE 5

A creamed mushrooms and chicken product was prepared by placing the following ingredients in a standard boil-in-the-bag package:

|  | Grams |
|---|---|
| Frozen mushroom slices of Ex. 1 | 100 |
| Cooked chicken meat | 40 |
| Chicken fat | 1 |
| Powdered ice | 44 |
| Sauce B of Ex. 3 | 15 |

The chicken meat was prepared by pressure cooking a fowl for 45 minutes and cutting the meat into 1 inch cubes.

The packaged contents were frozen and kept frozen until ready to use, at which time the contents were prepared for consumption by being heated as set forth in Example 4.

In each of the following examples, 6 through 8, the products were packaged, frozen, and heated for use as set forth in Example 4. They are set forth to more clearly illustrate the various vegetable, meat, and fish preparations that can be made according to the instant invention.

EXAMPLE 6

A creamed mushrooms and chipped beef product was prepared using the following formulation:

|  | Grams |
|---|---|
| Frozen mushroom slices of Ex. 1 | 100 |
| Dried beef | 25 |
| Frozen celery (¼″ by ¼″ pieces) | 20 |
| Powdered ice | 49 |
| Sauce A of Ex. 3 | 15 |

EXAMPLE 7

A creamed mushrooms and tunafish product was prepared of the following formulation:

|  | Grams |
|---|---|
| Frozen mushroom slices of Ex. 1 | 100 |
| Tunafish | 30 |
| Peas (frozen) | 20 |
| Pimiento of Ex. 4 | 5 |
| Worcestershire Sauce | (½ drop used) |
| Powdered ice | 45 |
| Sauce B of Ex. 3 | 15 |

EXAMPLE 8

A series of creamed vegetables were prepared using 100 grams of each frozen vegetable (frozen by standard commercial methods) with 15 grams of Sauce B of Example 3. In each case varying amounts of powdered ice were added so that the sauce would reconstitute to the proper consistency utilizing all the liquids in the bag during heating. For each vegetable the following amount of powdered ice was used:

| | Grams of ice |
|---|---|
| Asparagus | 70 |
| Cut green beans | 100 |
| Cauliflower | 90 |
| Peas | 90 |
| Cabbage | 90 |
| Turnips | 90 |
| Canned onions | 100 |
| Peas and carrots | 90 |

It will be understood that the invention is applicable to all comestibles although especially useful with vegetables, and that individual taste will dictate what particular flavorings and proportions are used in the sauces.

It will be understood that it is intended to cover all changes and modifications of the examples of the invention herein chosen for the purpose of illustration which do not constitute departures from the spirit and scope of the invention.

What is claimed is:

1. A boil-in-the-bag frozen food package comprising a sealed heat-resistant container and within said container a frozen comestible and a dry sauce mix, said sauce mix being present in an amount sufficient to use in its conversion to a liquid sauce, the liquid resulting solely from heating the sealed container in preparation of the contents for consumption.

2. The package of claim 1, in which the comestible is a vegetable.

3. The package of claim 1, in which a frozen source of liquid is included within the container, the comestible is vegetable, the liquid exuding from the vegetable and the melted frozen source of liquid resulting from heating of the sealed container in preparation of the contents for consumption.

4. The package of claim 2, in which the dry sauce mix contains a starch soluble at from about 170° F. to about 180° F.

5. The package of claim 4, in which the vegetable is mushrooms.

6. The method of making a boil-in-the-bag frozen food product comprising the steps of freezing a comestible, placing said comestible in a heat-resistant container with a dry sauce mix and sealing said container, said sauce mix being present in an amount sufficient to use in its conversion to a liquid sauce, the liquid resulting solely from heating the sealed container in preparation of the contents for consumption.

7. The method of claim 6, in which a frozen source of liquid is also placed in the container.

8. The method of claim 6, in which the dry sauce mix contains a starch soluble at from about 170° F. to about 180° F., and the comestible is a vegetable.

9. The method of claim 6, in which the air in the container is evacuated prior to sealing.

10. The method of claim 6, in which the comestible is mushrooms and the container is a heat resistant plastic bag.

References Cited

UNITED STATES PATENTS

| 3,132,029 | 5/1964 | Beck | 99—174 |
| 3,235,390 | 2/1966 | Vischer | 99—194 |
| 3,293,048 | 12/1966 | Kitterman | 99—171 |
| 3,415,664 | 2/1968 | Montgomery | 99—192 |

A. LOUIS MONACELL, Primary Examiner

R. B. ANDEWELT, Assistant Examiner

U.S. Cl. X.R.

99—171, 192